(12) United States Patent
Kim et al.

(10) Patent No.: US 9,525,178 B2
(45) Date of Patent: Dec. 20, 2016

(54) REDOX FLOW SECONDARY BATTERY

(71) Applicant: KOREA ELECTRONICS TECHNOLOGY INSTITUTE, Seongnam-si, Gyeonggi-do (KR)

(72) Inventors: Youngjun Kim, Yongin-si (KR); Kijae Kim, Seoul (KR); Minsik Park, Suwon-si (KR); Jeahun Kim, Yongin-si (KR)

(73) Assignee: KOREA ELECTRONICS TECHNOLOGY INSTITUTE, Seongnam-Si, Gyeonggi-Do (KR)

( * ) Notice: Subject to any disclaimer, the term of this patent is extended or adjusted under 35 U.S.C. 154(b) by 45 days.

(21) Appl. No.: 14/376,701

(22) PCT Filed: Jan. 31, 2013

(86) PCT No.: PCT/KR2013/000781
§ 371 (c)(1),
(2) Date: Aug. 5, 2014

(87) PCT Pub. No.: WO2013/118998
PCT Pub. Date: Aug. 15, 2013

(65) Prior Publication Data
US 2015/0030954 A1    Jan. 29, 2015

(30) Foreign Application Priority Data
Feb. 9, 2012    (KR) .................. 10-2012-0013470

(51) Int. Cl.
*H01M 8/18*    (2006.01)
*H01M 4/86*    (2006.01)
(Continued)

(52) U.S. Cl.
CPC ............ *H01M 4/8605* (2013.01); *C23C 30/00* (2013.01); *H01M 2/40* (2013.01); *H01M 4/9041* (2013.01);
(Continued)

(58) Field of Classification Search
CPC ................................ H01M 8/188; H01M 8/20
See application file for complete search history.

(56) References Cited

U.S. PATENT DOCUMENTS 5,545,492 A * 8/1996 Zito ...................... H01M 8/184
429/206
2011/0097479 A1    4/2011 Ravet et al.
(Continued)

FOREIGN PATENT DOCUMENTS

JP    2001015144 A    1/2001
JP    2004063423 A    2/2004
(Continued)

OTHER PUBLICATIONS

Korean Notice of Allowance for application No. 10-2012-0013470 dated Sep. 12, 2014.
(Continued)

*Primary Examiner* — Stewart Fraser
*Assistant Examiner* — Olatunji Godo
(74) *Attorney, Agent, or Firm* — Hauptman Ham, LLP

(57) ABSTRACT

The present invention relates to a redox flow secondary battery. The redox flow secondary battery of the present invention comprises a unit cell including a pair of electrodes made of a porous metal, wherein the surface of the porous metal is coated with carbon. According to the present invention, a redox flow secondary battery using porous metal electrodes uniformly coated with carbon is provided, thus improving conductivity of the electrodes, and the electrodes have surfaces uniformly coated with a carbon layer having a wide specific surface area, thus improving reactivity. As a result, capacity of the redox flow secondary (Continued)

battery and energy efficiency can be improved and resistance of a cell can be effectively reduced. Further, the electrodes are uniformly coated with a carbon layer, thus also improving corrosion resistance.

10 Claims, 4 Drawing Sheets

(51) Int. Cl.
    *C23C 30/00*     (2006.01)
    *H01M 2/40*     (2006.01)
    *H01M 4/90*     (2006.01)
    *H01M 4/92*     (2006.01)
    *H01M 8/20*     (2006.01)
    *H01M 8/24*     (2016.01)

(52) U.S. Cl.
    CPC ............... *H01M 4/92* (2013.01); *H01M 8/188* (2013.01); *H01M 8/20* (2013.01); *H01M 8/24* (2013.01); *H01M 2250/10* (2013.01); *H01M 2300/0017* (2013.01); *Y02B 90/14* (2013.01); *Y02E 60/528* (2013.01)

(56) References Cited

U.S. PATENT DOCUMENTS

2011/0117411 A1*   5/2011   Horne ................. B60L 11/1824
                                                             429/120
2012/0135278 A1*   5/2012   Yoshie ................. H01M 8/188
                                                             429/7

FOREIGN PATENT DOCUMENTS

| KR | 1020100040606 A | 4/2010 |
| KR | 1020100101885 A | 9/2010 |
| KR | 101067867 B1 | 9/2011 |
| KR | 1020110113513 A | 10/2011 |
| WO | WO 2010143634 | * 12/2010 |

OTHER PUBLICATIONS

International Search Report for application No. PCT/KR2013/000781 dated May 15, 2013.

* cited by examiner

REDOX FLOW SECONDARY BATTERY

CROSS-REFERENCE TO RELATED APPLICATION

This application claims priority to and the benefit of Korean Patent Application No. 10-2012-0013470 filed in the Korean Intellectual Property Office on Feb. 9, 2012 respectively, the entire contents of which are incorporated herein by reference.

TECHNICAL FIELD

The present invention relates to a secondary battery, and more particularly, to a redox flow secondary battery that uses an electrode in which a porous metal is coated with carbon.

BACKGROUND

Electricity storage technologies are important technologies for efficiently maximizing performance in areas such as efficient use of electricity, improvement of ability or reliability of a power supply system, expansion of introducing renewable energy in which a range of changes depending on time is large, energy recuperation of a moving object, and the like, throughout an entire energy industry, and their development possibilities to meet demands for social contribution are being gradually increased.

In order to adjust a supply-demand balance of a semi-autonomous local power supply system such as a microgrid, appropriately distribute non-uniform output of development of the renewable energy such as wind power or solar energy generation, and control an influence of voltage and frequency changes generated by a difference from a conventional electric power system, studies on secondary batteries are being actively conducted, and expectations with respect to the utilization of the secondary batteries are being increased in these fields.

Referring to characteristics required for a secondary battery to be used for storing of high-capacity power, the secondary battery should have a high energy storage density, and thus a redox flow secondary battery is being spotlighted as the secondary battery having a high capacity and high efficiency, which is the most appropriate to these characteristics.

The redox flow secondary battery is formed so that a cell frame forms an outline of an entire cell, a center of the cell is divided by an ion exchange layer, and an anode and a cathode are located at both sides of the ion exchange layer.

Further, the redox flow secondary battery is formed to include a bipolar plate and a current collector for externally conducting electricity from each of the electrodes provided, an anode tank and a cathode tank, which store electrolytes, an inlet in which the electrolytes flow in, and an outlet in which the electrolytes flow out.

Various studies are being conducted on such the redox flow secondary battery to develop to an increase in both output and energy efficiency. Recently, a non-aqueous electrolyte rather than an aqueous electrolyte has been mainly used.

As described above, in order to develop the redox flow secondary battery to which the non-aqueous electrolyte is applied, use of the electrode in which affinity with the non-aqueous electrolyte is high and having excellent electrical conductivity is required, and thus research and development of the electrode in which these requirements are satisfied are urgently needed.

In the case of a carbon-based material used for an energy electrode material of a commercial redox flow secondary battery, since affinity with the non-aqueous electrolyte is very low as well as conductivity is significantly reduced compared to a metal electrode, improvement in energy efficiency is limited when applied to a non-aqueous redox flow secondary battery.

Various studies for development of the metal electrodes are being conducted to improve an electrochemical characteristic of the non-aqueous redox flow secondary battery. However, there is a limit on increase of a specific surface area of the metal electrode in a manufacturing process, and thus these studies are not proposing a fundamental solution to an improvement of energy efficiency of the non-aqueous redox flow secondary battery.

SUMMARY

The present invention is directed to providing a redox flow secondary battery capable of ensuring conductivity of an electrode using a porous metal having excellent conductivity.

The present invention is also directed to providing a redox flow secondary battery using a porous metal electrode uniformly coated with carbon having a large specific surface area to improve energy efficiency.

The present invention is also directed to providing a redox flow secondary battery in which a porous metal electrode is coated with carbon having a large specific surface area and thus reactivity is improved.

One aspect of the present invention provides a redox flow secondary battery including a unit cell, a pair of current collectors, and a pair of cell frames. The unit cell is formed of a porous metal, and includes a pair of electrodes formed at a surface of the porous metal coated with carbon. The pair of current collectors are bonded to both outer surfaces of the unit cell. The pair of cell frames are attached to each outer surface of the current collectors.

In the redox flow secondary battery according to the present invention, the amount of carbon coated on the surface of the porous metal may be 50 wt % or less compared to a weight of the porous metal.

In the redox flow secondary battery according to the present invention, the porous metal may be any one selected from nickel (Ni), copper (Cu), iron (Fe), molybdenum (Mo), titanium (Ti), platinum (Pt), and iridium (Ir).

In the redox flow secondary battery according to the present invention, the coating may be performed using any one selected from a dip coating method and a spray coating method.

In the redox flow secondary battery according to the present invention, a carbon content of coating slurry for the coating may be 50 wt % or more.

In the redox flow secondary battery according to the present invention, the unit cell includes an ion exchange layer, the pair of electrodes each bonded to both surfaces of the ion exchange layer and including an anode and a cathode, and a pair of plates in which one surface is bonded to an outer surface of each of the pair of electrodes and the other surface is bonded to the current collector.

In the redox flow secondary battery according to the present invention, the unit cell generates electricity according to an oxidation-reduction reaction through the ion exchange layer between the electrodes.

The redox flow secondary battery according to the present invention may further include anode and cathode tanks, pumps, inlets, and outlets. The anode and cathode tanks are disposed at left and right sides of cell frame, respectively, and configured to store an electrolyte to flow the electrolyte. The pumps each are connected to the anode and cathode tanks, and supplies the electrolyte. The inlet connects the pump to the cell frame so that the electrolyte flows into the unit cell through the cell frame. The outlet connects to the cell frame so that the electrolyte flowed out from the unit cell flows into the anode and cathode tanks.

Another aspect of the present invention provides a redox flow secondary battery including at least one unit cell having at least one pair of electrodes formed of a porous metal coated with carbon.

Still another aspect of the present invention provides a redox flow secondary battery including a pair of cell frames formed to face and to be spaced apart from each other, a pair of current collectors each attached to inner surfaces of the pair of cell frames, and at least two unit cells formed between the pair of current collectors, wherein the unit cell includes at least one pair of electrodes formed of a porous metal coated with carbon.

According to the present invention, a redox flow secondary battery using a porous metal electrode uniformly coated with carbon is provided, and thus conductivity of the electrode is improved.

Further, a surface of the porous metal electrode is uniformly coated with a carbon layer having a large specific surface area, and thus reactivity can be improved.

Therefore, capacity of the redox flow secondary battery and energy efficiency can be improved and resistance of a cell can be effectively reduced. Further, the electrode is uniformly coated with the carbon layer, and thus corrosion resistance can also be improved.

DETAILED DESCRIPTION

Figure 1:
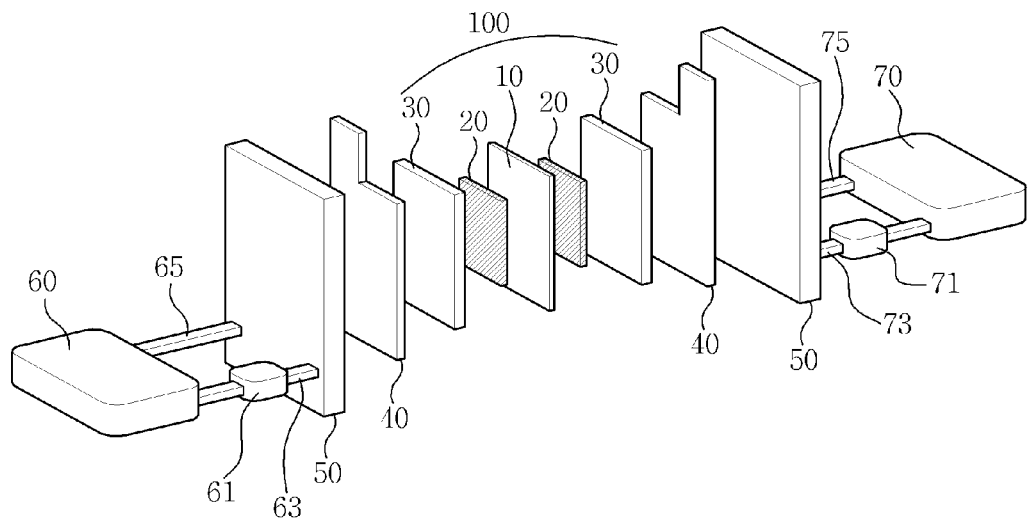
FIGS. 1 and 2 are views for describing a redox flow secondary battery according to an embodiment of the present invention.

Before detailed description of embodiments of the present invention, terms and words used in this specification and claims should not be interpreted as limited to commonly used meanings or meanings in dictionaries and should be interpreted with meanings and concepts which are consistent within the technological scope of the invention based on the principle that the inventors have appropriately defined concepts of terms in order to describe the invention in the best way. Therefore, since the embodiments described in this specification and configurations illustrated in drawings are only exemplary embodiments and do not represent the overall technological scope of the invention, it is understood that the present invention covers various equivalents, modifications, and substitutions at the time of the filing of this application.

Hereinafter, exemplary embodiments of the invention will be described in detail with reference to the accompanying drawings. The same reference numbers will be used throughout this specification to refer to the same or like parts. However, detailed descriptions of well-known functions or configurations that unnecessarily obscure the gist of the invention in the following explanations and accompanying drawings will be omitted. For the same reason, some components are exaggerated, omitted or schematically shown in the drawings, and a size of each component is not entirely reflected as an actual size.

Hereinafter, exemplary embodiments of the inventive concept will be described in detail with reference to the accompanying drawings.

Figure 2:
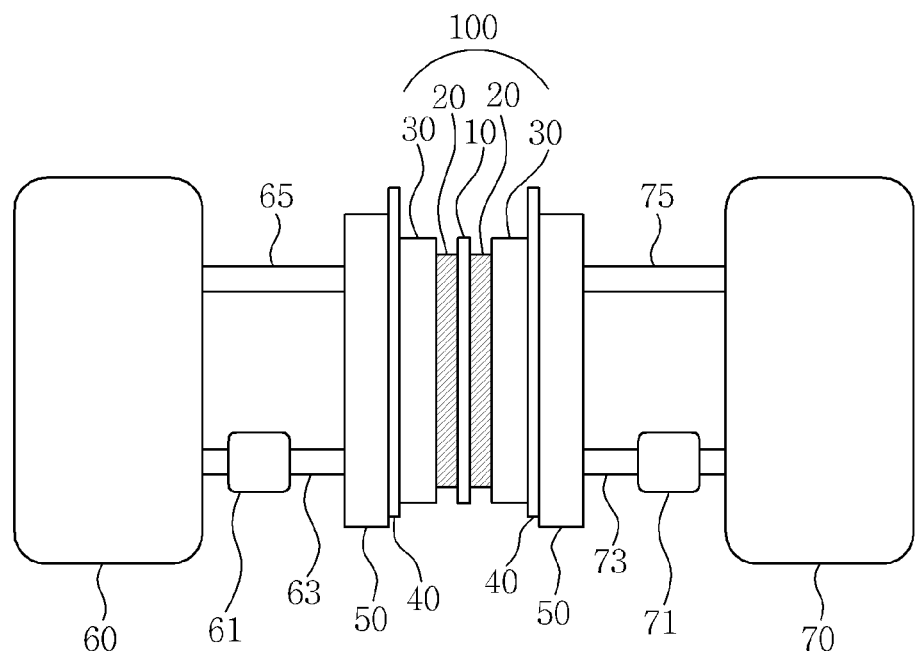

First, a redox flow secondary battery according to an embodiment of the present invention will be described. FIGS. 1 and 2 are views for describing the redox flow secondary battery according to the embodiment of the present invention. Here, FIG. 1 is an exploded view showing disassembled components of the redox flow secondary battery according to the embodiment of the present invention, and FIG. 2 is a cross-sectional view showing a cross section of the redox flow secondary battery according to the embodiment of the present invention.

Referring to FIGS. 1 and 2, the redox flow secondary battery according to the embodiment of the present invention is a secondary battery charged or discharged using an oxidation-reduction reaction of a metal ion in which valency is changed. Further, the redox flow secondary battery according to the embodiment of the present invention may be driven in a voltage range of 0 to 3.0 V.

The redox flow secondary battery according to the embodiment of the present invention may be formed to have a unit cell 100 having a multi-layer structure in a plate shape, a pair of current collectors 40 bonded to both outer surfaces of the unit cell 100 and formed in a plate shape, and cell frames 50 attached to outer surfaces of the current collectors 40, respectively, and formed in a plate shape.

Here, the unit cell 100 includes an ion exchange layer 10, electrodes 20, and bipolar plates 30 (hereinafter, abbreviated as "plates"), of which each have a plate shape, and has a structure in which the electrodes 20, in which an anode is opposite a cathode as a pair, each are bonded to both surfaces of the ion exchange layer 10 based on a center of the ion exchange layer 10, and the plates 30 each are bonded to outer surfaces of the anode and the cathode of the electrodes 20. Meanwhile, although not shown, a gasket may be selectively interposed between the electrode 20 and the ion exchange layer 10.

As described above, the ion exchange layer 10, the electrodes 20, and the plates 30, of which each have a plate shape, form a unit cell 100 in a multi-layer structure.

The oxidation-reduction reaction of the metal ion in which valency is changed occurs in the unit cell 100. In this case, the oxidation-reduction reaction occurs between the anode and the cathode of the electrodes 20 through the ion exchange layer 10, and thus electricity is generated by the oxidation-reduction reaction.

When the electricity is generated at the anode and the cathode of the electrodes 20 of the unit cell 100, the plates 30 and the current collectors 40 collect the generated electricity. The cell frames 50 maintains and supports a shape of the ion exchange layer 10, the pair of electrodes 20, the pair of plates 30, and the pair of current collectors 40 described above.

Further, the redox flow secondary battery according to the embodiment of the present invention may further include an anode tank 60, a cathode tank 70, pumps 61 and 71, inlets 63 and 73, and outlets 65 and 75.

The anode tank 60 and the cathode tank 70 store an anodic electrolyte and a cathodic electrolyte, respectively, to flow when required. It is preferably that the anode tank 60 and the cathode tank 70 respectively use non-aqueous electrolytes as the anodic electrolyte and the cathodic electrolyte, however, aqueous electrolytes may also be used. Such the anode tank 60 and the cathode tank 70 each are disposed on the both outer surfaces of the unit cell 100 corresponding to the anode and the cathode of the electrode 20 of the unit cell 100 described above.

Further, the anode tank 60 and the cathode tank 70 are connected to the cell frames 50 through the inlets 63 and 73 and the outlets 65 and 75, respectively. The inlets 63 and 73 are paths through which the electrolytes of the anode tank 60 and the cathode tank 70 flow into the unit cell 100, and the outlets 65 and 75 are paths through which the electrolytes flow from the unit cell 100. Further, the pumps 61 and 71 are provided to flow the electrolytes from the anode tank 60 and the cathode tank 70 and supply the electrolytes to the unit cell 100, and are interposed between the anode tank 60 and the inlet 63 and between the cathode tank 70 and the inlet 73, respectively.

Therefore, the electrolytes flowed out from the anode tank 60 and the cathode tank 70 may be supplied to the unit cell 100 through the pumps 61 and 71, the inlets 63 and 73, the cell frames 50, and the current collectors 40, respectively and in the reverse order, flowed and stored in the anode tank 60 and the cathode tank 70.

In the redox flow secondary battery configured according to the embodiment of the present as described above, the ion exchange layer 10 may be formed of Nafion. Further, the plates 30 may be formed of graphite.

As described above, the electrodes 20 are bonded to inner surfaces of the plates 30, respectively. Such the electrodes 20 each have a characteristic in which a surface of a porous metal is uniformly coated with a carbon layer. According to the embodiment of the present invention, the electrodes 20 are formed at the porous metal thereof is uniformly coated with carbon.

Here, the porous metal may be any one selected from nickel (Ni), copper (Cu), iron (Fe), molybdenum (Mo), titanium (Ti), platinum (Pt), and iridium (Ir).

Further, it is preferable that the porous metal is coated so that the amount of carbon coated on the surface of the porous metal is 50 wt % or less compared to a weight of the porous metal. Further, it is preferable that a dip coating method or a spray coating method is used as a coating method. When a carbon coating slurry for the coating is manufactured, the coating slurry is manufactured to have a carbon content of 50 wt % or more.

As described above, the porous metal electrode uniformly coated with carbon is used on surfaces of an aqueous or a non-aqueous redox flow secondary battery and a stacked type battery that will be described below, and thus capacity of the non-aqueous redox flow secondary battery and energy efficiency may be enhanced, and a corrosion characteristic may be improved.

Figure 3:
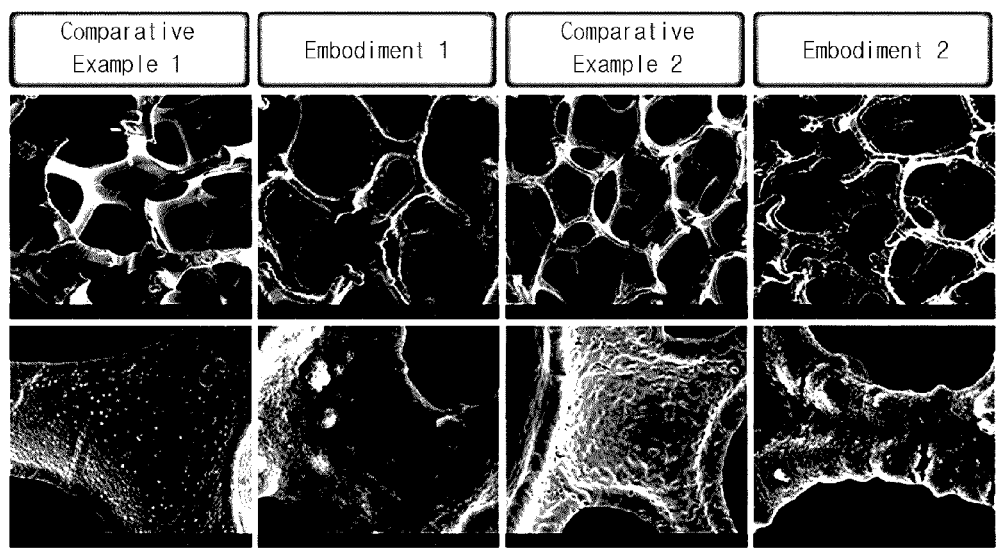
FIG. 3 is images for comparing the morphology of an electrode according to the present invention with comparative examples.

Next, a morphology of the electrode according to embodiments of the electrode of the present invention will be compared with comparative examples. FIG. 3 is images for comparing the morphology of the electrode according to the present invention, and field emission scanning electron microscope (FESEM) images of the comparative examples and the embodiments of the electrode of the present invention are disclosed.

Referring to FIG. 3, it may be determined that the electrodes 20 of the embodiments in which the surfaces of the porous metals are uniformly coated with carbon. Details of the comparative examples and the embodiments are as the following [Table 1].

TABLE 1

|  | Metal type | Pore Size | Amount of Carbon Coating |
|---|---|---|---|
| Comparative Example 1 | Ni | 800 | 0 wt % |
| Comparative Example 2 | Cu | 800 | 0 wt % |
| Embodiment 1 | Ni | 800 | 5 wt % |
| Embodiment 2 | Cu | 800 | 5 wt % |

The electrodes 20 of Embodiments 1 and 2 of the present invention are coated using a spray coating method, after slurry having a composition of Super-P:binder:N-methyl-pyrrolidinone (NMP)=2.5:2.5:95 is manufactured, when the surface of the porous metal is coated with carbon. The amount of coated carbon (amount of carbon coating) was measured as a weight ratio of the coating before and after.

Figure 4:
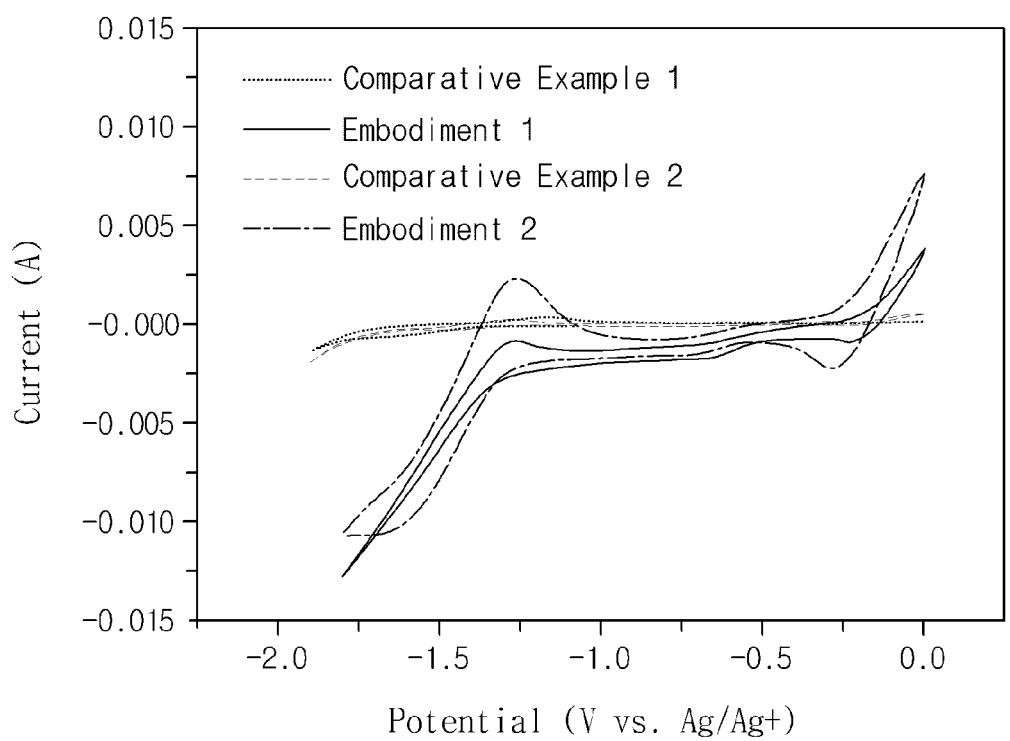
FIGS. 4 and 5 are graphs for comparing cyclic voltammetry (CV) characteristics of embodiments of the electrode according to the present invention with comparative examples.
Figure 5:
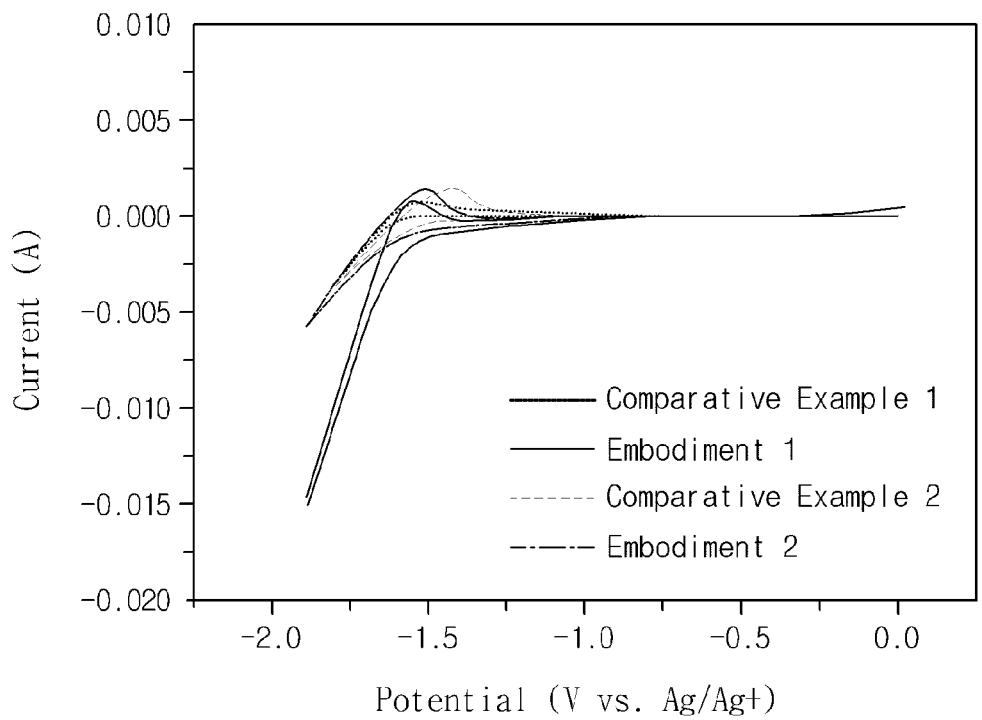

A cyclic voltammetry (CV) characteristic of the electrode of the present invention will be compared through the embodiment of the electrode of the present invention and the comparative examples. FIGS. 4 and 5 are graphs for comparing CV characteristics of the embodiments of the electrodes according to the present invention with the comparative examples. Here, the CV characteristic evaluation was performed on Comparative examples 1 and 2 of [Table 1] described above and the embodiments of the porous metal electrode coated with carbon using a spray coating method of a propylene carbonate (PC)-based organic electrolyte.

In FIGS. 4 and 5, in order to evaluate an electrochemical characteristic of the porous metal electrode coated with carbon, a CV measurement was performed in various non-aqueous electrolytes. In this case, the measurement was performed under a condition of a scan rate of 1 mV/s in a potential area in a range of −1.8 to 0.0 V compared to Ag/Ag$^+$. FIG. 4 is a graph showing the CV characteristics of the comparative examples and the embodiments in a Co(bpy)$^+$PC electrolyte, and FIG. 5 is a graph showing the CV characteristics of the comparative examples and the embodiments in an Ni(bpy)$^+$PC electrolyte.

As shown in FIGS. 4 and 5, referring to CV results of the comparative examples and the embodiments, when copper (Cu) and nickel (Ni) porous metal electrode coated with carbon is applied in various PC-based non-aqueous electrolytes, it may be determined that reactivity of the embodiments is significantly increased compared to that of the comparative examples. That is, it may be determined that a current value to be used for oxidation of the ion was increased. The increase of the current value is due to improvement of conductivity of the electrode using the porous metal, and also because the carbon coated on the surface of the porous metal efficiently provides a redox reaction site.

Figure 6:
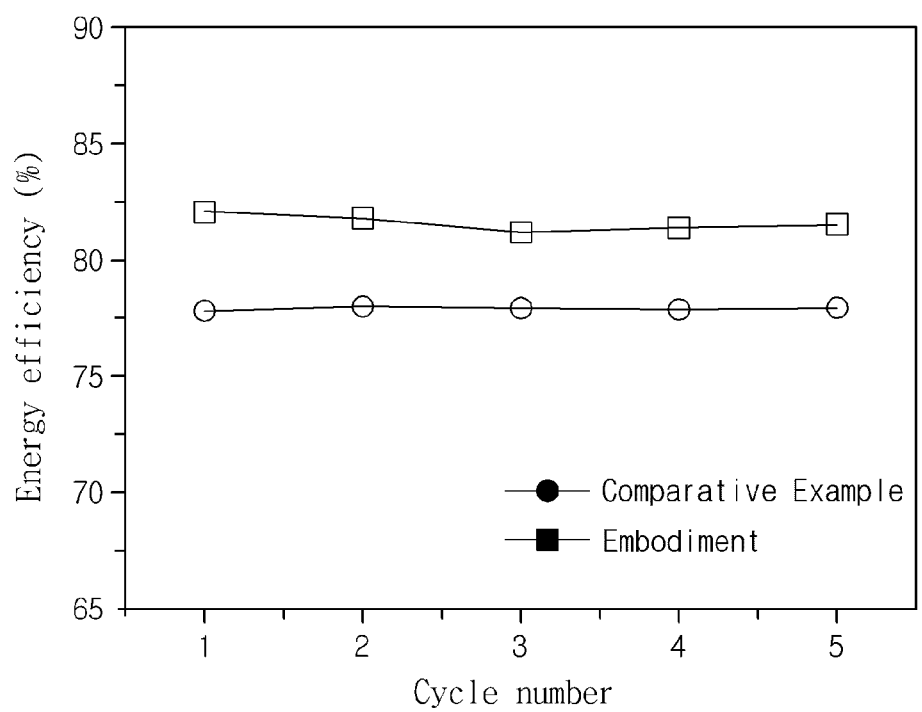
FIG. 6 is a graph for comparing energy efficiency of the embodiment of the electrode according to the present invention with the comparative example.

Next, energy efficiency characteristics of the electrode of the present invention will be compared through the embodiment of the electrode of the present invention and a comparative example. FIG. 6 is a graph for comparing energy efficiency of the embodiment of the electrode according to the present invention with a comparative example. Here, energy efficiency of cells to which Comparative examples 1 and 2 are applied as an anode and a cathode, and energy efficiency of cells to which Embodiments 1 and 2 are applied as an anode and a cathode was compared.

Referring to FIG. 6, it may be determined that the cells which are coated with carbon according to applications of Embodiments 1 and 2 show enhanced Coulomb efficiency and energy efficiency. In the case of the applied embodiments, the initial energy efficiency is 82% which is a better characteristic than 77% of the energy efficiency of the applied comparative examples. Further, the Coulomb efficiency was increased from 93% to 95% through carbon coating on the surface of the porous metal electrode.

Figure 7:
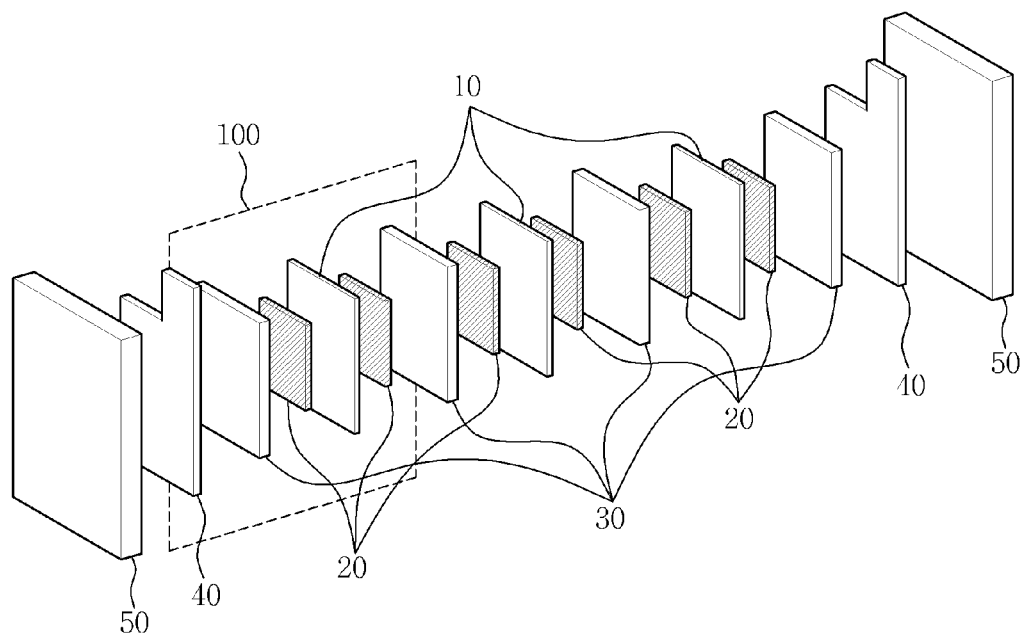
FIGS. 7 and 8 are views for describing a redox flow secondary battery according to another embodiment of the present invention.
Figure 8:
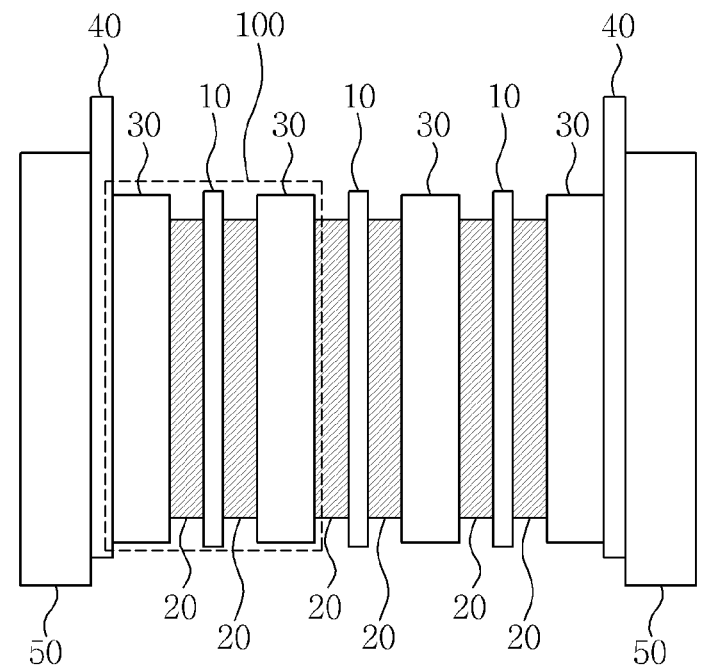

FIGS. 7 and 8 are views for describing a redox flow secondary battery according to another embodiment of the present invention. Here, FIG. 7 is an exploded view showing disassembled components of the redox flow secondary battery according to another embodiment of the present invention. FIG. 8 is a cross-sectional view showing a cross section of the redox flow secondary battery according to another embodiment of the present invention.

Referring to FIGS. 7 and 8, the redox flow secondary battery according to another embodiment of the present invention is a secondary battery charged or discharged using oxidation-reduction reaction of a metal ion in which valency is changed. Further, the redox flow secondary battery according to another embodiment of the present invention may be driven in a voltage range of 1.5 to 3.0 V.

The redox flow secondary battery according to another embodiment of the present invention includes a pair of cell frames 50, a pair of current collectors 40, and a plurality of unit cells 100.

The pair of cell frames 50 are spaced apart from each other by a predetermined distance and opposite each other. As described above, the pair of current collectors 40 are bonded to inner surfaces of the pair of cell frames 50 facing each other, respectively. The plurality of unit cells 100 are interposed between the pair of current collectors 40. As described above, the plurality of unit cells 100 each include an ion exchange layer 10, electrodes 20 including an anode and a cathode, and plates 30. As shown, the plurality of unit cells 100 are connected to each other in series and share the plates 30 connected to each other. For example, the redox flow secondary battery in which three unit cells 100 are formed is shown in FIGS. 7 and 8. As shown, since the three unit cells 100 share the two connected plates 30, there are four plates 30. Such the redox flow secondary battery according to another embodiment of the present invention is a stacked type battery in which the three unit cells 100 are stacked in series.

As described above, in a structure in which the plurality of unit cells 100 are connected to each other in series, the electrodes 20 each have a characteristic in that a surface of a porous metal thereof is uniformly coated with a carbon layer as disclosed in FIG. 3. Since each electrode 20 has the same configuration as the electrode of the redox flow secondary battery according to the embodiment of the present invention, detail descriptions will be omitted.

Further, although not shown in FIGS. 7 and 8, the redox flow secondary battery according to another embodiment of the present invention further includes an anode tank 60, a cathode tank 70, pumps 61 and 71, inlets 63 and 73, and outlets 65 and 75 as the same as the redox flow secondary battery according to the embodiment of the present invention.

The anode tank 60 and the cathode tank 70 store an anodic electrolyte and a cathodic electrolyte, respectively, to be flowed when required, and use a non-aqueous electrolyte as the anode and cathode electrolytes. Such the anode tank 60 and the cathode tank 70 each are disposed at left and right sides of the unit cell 100 corresponding to the anode and the cathode of the electrode 20 of the unit cell 100 described above. Further, the anode tank 60 and the cathode tank 70 are connected to the cell frames 50 through the inlet 63 and 73 and the outlet 65 and 75, respectively. Further, the pumps 61 and 71 are provided to flow the electrolytes from the anode tank 60 and the cathode tank 70 and supply the electrolytes to the unit cells 100, and are interposed between the anode tank 60 and the inlet 63 and between the cathode tank 70 and the inlet 73, respectively. That is, the electrolytes flowed out from the anode tank 60 and the cathode tank 70 may be supplied to the unit cells 100 through the pumps 61 and 71, the inlets 63 and 73, the cell frames 50, and the current collectors 40, respectively and in the reverse order, flowed and stored in the anode tank 60 and the cathode tank 70.

Meanwhile, in the above-described embodiments, it was described for coating on the porous metal using only a dip coating method or a spray coating method. However, the embodiment of the present invention is not limited thereto. That is, various methods such as a vapor deposition method, a sputtering method, a chemical vapor deposition method, and the like may be selectively or complexly used if necessary.

Further, in the above-described embodiments, it was described in an example for a case in which the electrode is formed of a porous metal. However, the embodiment of the present invention is not limited thereto, and the metal may be formed in a mesh shape. Further, a type in a flat plate shape, such as a conventional type, may also be possible when appropriately coated with carbon.

Further, in the above-described embodiments, it was described in an example for a case in which the coating layer is formed on the electrode of the non-aqueous redox flow secondary battery. However, the embodiment of the present invention is not limited thereto, and may also be applied to the electrode of the aqueous redox flow secondary battery.

In addition, in the above-described embodiments, it was described as an example as to the electrode provided in the redox flow secondary battery. However, the embodiment of the present invention is not limited thereto; the electrode may be widely applied to a battery including the electrode accommodated in an electrolyte, and specifically, to a stacked type battery.

In this specification, exemplary embodiments of the present invention have been classified into the first, second and third exemplary embodiments and described for conciseness. However, respective steps or functions of an exemplary embodiment may be combined with those of another exemplary embodiment to implement still another exemplary embodiment of the present invention.

What is claimed is:
1. A redox flow secondary battery, comprising:
   a unit cell comprising:
      a first electrode comprising;
         a first porous metal; and
         a first carbon coating on the first porous metal; and
      a second electrode comprising:
         a second porous metal; and
         a second carbon coating on the second porous metal;

a first current collector bonded to a first outer surface of the unit cell;
a second current collector bonded to a second outer surface of the unit cell;
a first cell frame attached to an outer surface of the first current collector; and
a second cell frame attached to an outer surface of the second current collector,
wherein each of the first porous metal and the second porous metal compromises one selected from the group consisting of nickel(Ni), copper(Cu), iron(Fe), molybdenum(Mo), titanium(Ti), and platinum(Pt), and
wherein an amount of carbon in each of the first and second carbon coating is 50 wt % or less compared to a weight of the corresponding first or second porous metal.

2. The battery of claim 1, wherein each of the first and second carbon coatings is coated by using any one selected from a dip coating method and a spray coating method.

3. The battery of claim 1, wherein each of the first and second carbon coatings is coated by using a coating slurry comprising 50 wt % or more carbon content.

4. The battery of claim 1, wherein the unit cell further comprises:
an ion exchange layer;
wherein the first electrode is an anode and is bonded to a first surface of the ion exchange layer, and the second electrode in a cathode and is bonded to a second surface of the ion exchange layer;
a first plate comprising a first surface bonded to an outer surface of the first electrode and a second surface bonded to the first current collector; and
a second plate comprising a first surface bonded to an outer surface of the second electrode and a second surface bonded to the second current collector.

5. The battery of claim 4, wherein the unit cell is configured to generate electricity according to oxidation-reduction reaction through the ion exchange layer between the first and second electrodes.

6. The battery of claim 1, further comprising:
an anode tank connected with an outer surface of the first cell frame;
an cathode tank connected with an outer surface of the second cell frame,
wherein the anode and cathode tanks are configured to store an electrolyte;
pumps each connected to one of the anode and cathode tanks, and configured to supply the electrolyte;
inlets each configured to connect one of the pumps to one of the first and second cell frames so that the electrolyte flows into the unit cell through the first and second cell frames; and
outlets each connected to one of the first and second cell frames so that the electrolyte flowed out from the unit cell flows into the anode or cathode tank.

7. A redox flow secondary battery, comprising:
at least one unit cell having at least one pair of electrodes, wherein the pair of electrodes comprises:
a first electrode comprising:
a first porous metal; and
a first carbon coating on the first porous metal; and
a second electrode comprising:
a second porous metal; and
a second carbon coating on the second porous metal, and
wherein each of the first porous metal and the second porous metal comprises one selected from the group consisting of nickel(Ni), copper(Cu), iron(Fe), molybdenum(Mo), titanium(Ti), and platinum(Pt), and
wherein an amount of carbon in each of the first and second carbon coating is 50 wt % or less compared to a weight of the corresponding first or second porous metal.

8. The battery of claim 7, wherein each of the first and second carbon coatings is coated by using any one selected from a dip coating method and a spray coating method.

9. The battery of claim 7, wherein each of the first and second carbon coatings is coated by using a coating slurry comprising 50 wt % or more carbon content.

10. A redox flow secondary battery, comprising:
a pair of cell frames facing and spaced apart from each other;
a pair of current collectors attached to inner surfaces of the pair of cell frames, respectively; and
at least two unit cells disposed between the pair of current collectors,
wherein each of the at least two unit cells includes at least one pair of electrodes, and
wherein the pair of electrodes comprises;
a first electrodes comprising:
a first porous metal; and
a first carbon coating on the first porous metal; and
a second electrode comprising:
a second porous metal; and
a second carbon coating on the second porous metal,
wherein each of the first porous metal and the second porous metal comprises one selected from the group consisting of nickel(Ni), copper(Cu), iron(Fe), molybdenum(Mo), titanium(Ti), and platinum(Pt), and
wherein an amount of carbon in each of the first and second carbon coating is 50 wt % or less compared to a weight of the corresponding first or second porous metal.

* * * * *